(12) United States Patent
Koike

(10) Patent No.: US 6,246,864 B1
(45) Date of Patent: Jun. 12, 2001

(54) WIRELESS MICROPHONE USE UHF BAND CARRIER FM TRANSMITTER

(75) Inventor: Yukinaga Koike, Nagano (JP)

(73) Assignee: Circuit Design, Inc., Hotaka-machi (JP)

( * ) Notice: Subject to any disclaimer, the term of this patent is extended or adjusted under 35 U.S.C. 154(b) by 0 days.

(21) Appl. No.: 09/159,393

(22) Filed: Sep. 23, 1998

(30) Foreign Application Priority Data

Sep. 25, 1997 (JP) .................................... 9-260245

(51) Int. Cl.[7] .................................................. H04B 1/04
(52) U.S. Cl. .......................... 455/110; 455/112; 455/118
(58) Field of Search .................................... 455/110, 113, 455/112, 118; 381/14, 26, 91, 122

(56) References Cited

U.S. PATENT DOCUMENTS 5,790,942 * 8/1998 Le Corre et al. ..................... 455/110
5,794,130 * 8/1998 Abe et al. ............................ 455/113

* cited by examiner

*Primary Examiner*—Curtis Kuntz
*Assistant Examiner*—Melur Ramakrishnaiah
(74) *Attorney, Agent, or Firm*—Armstrong, Westerman, Hattori, McLeland & Naughton (57) ABSTRACT

A wireless microphone use UHF band carrier FM transmitter adopting a PLL system, which has a voltage controlled crystal oscillation type modulator (VCXO) for performing FM modulation on an oscillation frequency of a crystal oscillation circuit by an input of a modulation signal AF of an acoustic signal and which uses an FM modulated signal $f_r$ obtained from the VCXO as a reference signal $V_r$ to be input to an analog phase comparator (PC) of a PLL circuit 60. The PC performs a phase comparison operation at a high speed (10 MHz or more), therefore a cutoff frequency of a loop filter (62) may be a high band frequency of about 100 KHz to 1 MHz so that the cutoff frequency considerably higher than the highest audible frequency 20 KHz can be selected. The filter output moves at an inaudible frequency and therefore there is no audible noise generated even due to vibration, feedback, etc. It is also possible to make the charge pump circuit and other steps for shielding against interference and steps for giving resistance to vibration superfluous without adopting the loop filter switching system, therefore a reduction of size and a lowering of cost can be realized.

5 Claims, 5 Drawing Sheets

WIRELESS MICROPHONE USE UHF BAND CARRIER FM TRANSMITTER

BACKGROUND OF THE INVENTION

1. Field of the Invention

The present invention relates to a UHF band carrier FM transmitter suitable for use in a wireless microphone such as a hand-held type which can be held and carried in the hand or a mounted type which can be mounted on the body or clothing, and more particularly relates to an improvement of a PLL system in the transmitter.

2. Description of the Related Art

Figure 4:
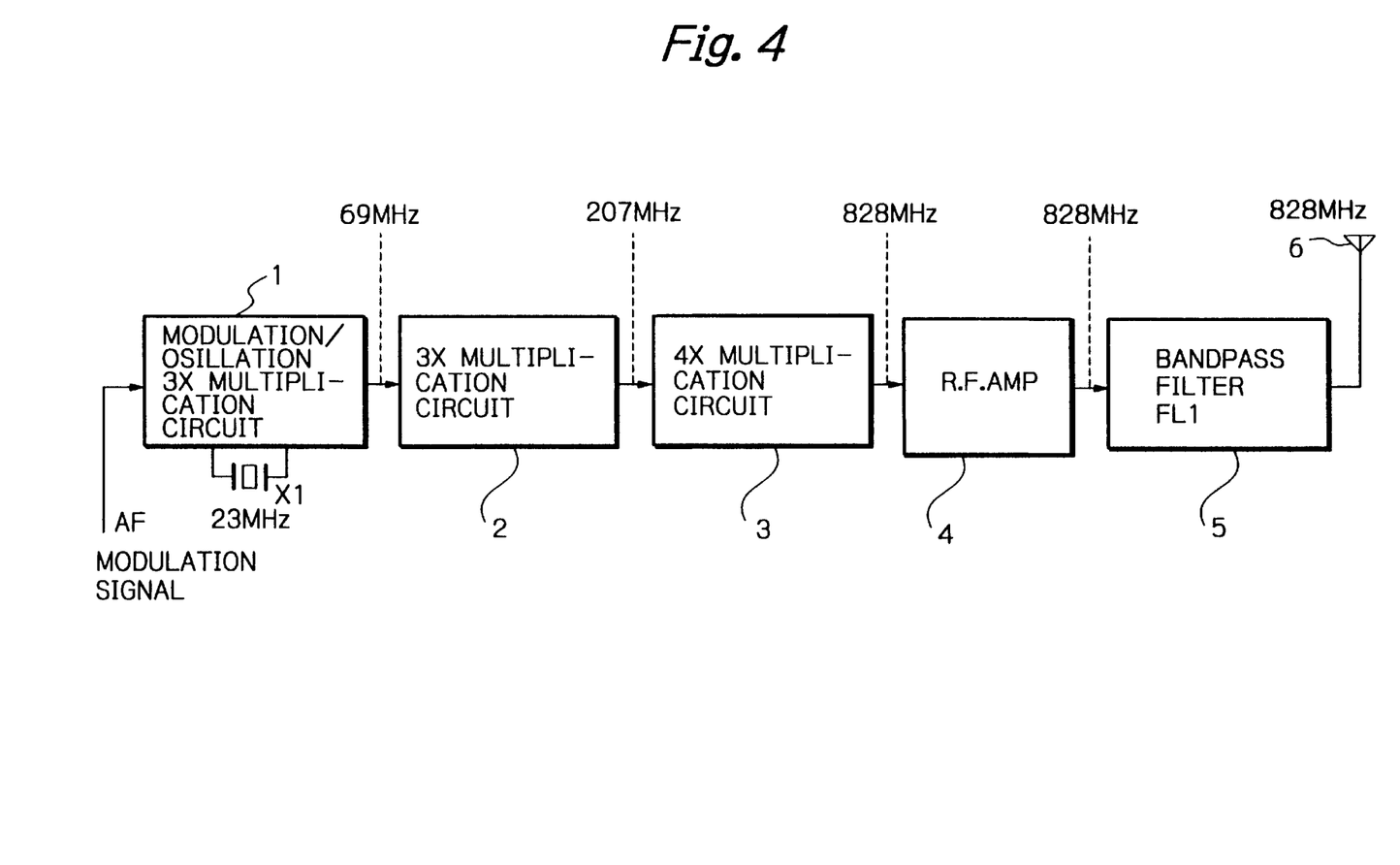
FIG. 4 is a block diagram of an acoustic wireless microphone transmitter adopting a crystal oscillation/multiplication system of the related art.

Conventionally, as an acoustic wireless microphone transmitter, a crystal oscillation/ multiplication system used at a very high frequency (VHF band: 30 MHz to 300 MHz) has been known. Recently, due to revisions in the regulations of different countries relating to radio waves, operation of acoustic wireless microphone transmitters even at a ultra high frequency (UHF band: 300 MHz to 3000 MHz) has come to be recognized. The crystal oscillation/ multiplication system compatible with the UHF band comprises, for example, as shown in FIG. 4, a modulation/oscillation/3× multiplication circuit 1 for performing frequency modulation (FM modulation) by voltage controlled oscillation by changing a load capacitance of a crystal oscillator X1 having a resonance frequency of 23 MHz by an input acoustic signal, i.e., a modulation signal AF having an audible frequency of 10 Hz to 20 KHz and for multiplying the frequency of the modulated wave by 3; a 3× multiplication circuit 2 for multiplying the frequency of an output wave thereof (center frequency: 69 MHz) by 3; a 4× multiplication circuit 3 for multiplying a multiplied output wave thereof (center frequency: 207 MHz) by 4; a radio frequency amplifier 4 for amplifying the electric power of the multiplied output wave (center frequency: 828 MHz) to create a transmission electric power (10 mW); a bandpass filter FL1 such as a helical resonator having a sharp selection characteristic; and an in-housing antenna 5.

When the transmission frequency changes from a VHF band to the UHF band, in a crystal oscillation/multiplication system, due to the point that a number of multiplication steps inevitably becomes large and the point that filters of sub-tuning circuits (tank circuits) for reducing spurious emission have to be inserted for every multiplication circuit, a great increase in the number of individual parts such as inductors and capacitors unsuitable for formation on an IC is induced. It is therefore difficult to use this system for an acoustic wireless microphone transmitter—for which a reduction of size and a lowering of cost are required. Particularly, since a circuit constant of the filter of each multiplication stage has been adjusted to make it compatible with the crystal oscillator X1, it is not possible to deal with changes in channels just by replacing or switching crystal oscillators X1 having different resonance frequencies, so in principle the circuit configuration is unsuitable for an increase in channels.

Figure 5:
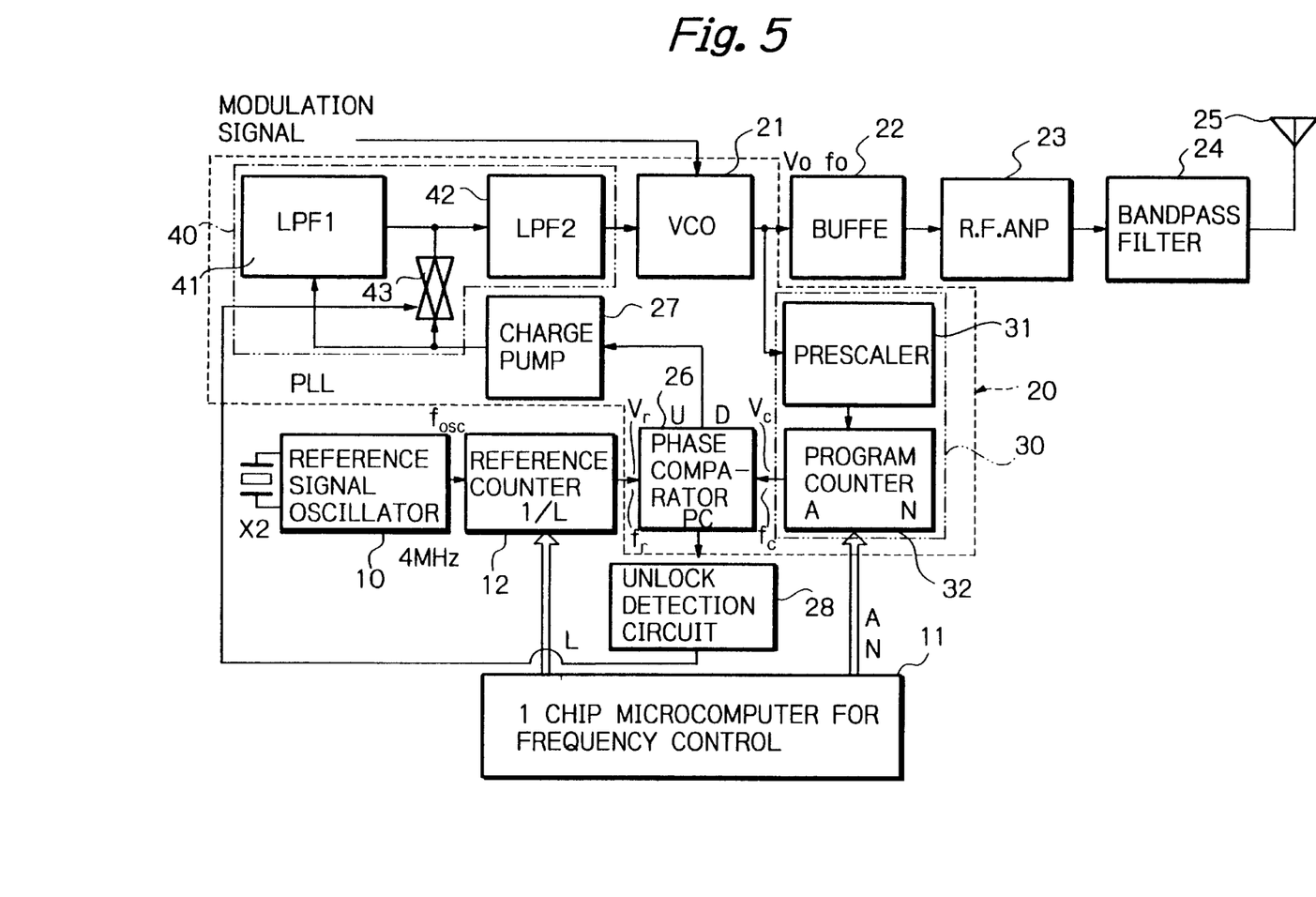
FIG. 5 is a block diagram of an acoustic wireless microphone transmitter adopting a PLL frequency synthesizer system of the related art.

Therefore, at present, even in acoustic wireless microphone transmitters, a PLL frequency synthesizer system compatible with an increase in channels has become the mainstream. A wireless microphone use UHF band carrier FM transmitter using a dual modulus prescaler system for this PLL frequency synthesizer, for example, as shown in FIG. 5, comprises a reference counter (variable reference frequency divider) 12 for obtaining a more stable reference frequency $f_r$ from the oscillation frequency $f_{osc}$ (4 MHz) of a reference oscillator 10 using crystal oscillation and making a channel interval (frequency step) variable by dividing the oscillation frequency $f_{osc}$ to 1/L by a frequency division ratio setting signal given from a microprocessor 11; a dual modulus prescaler type PLL (phase locked loop) circuit 20 having a voltage controlled oscillator 21 for effecting FM modulation by the use of the input modulation signal AF that is an acoustic signal; a buffer amplifier (buffer) 22 which is loosely coupled with the voltage controlled oscillator 21 to prevent the effect of the next stage on from being fed back to the voltage controlled oscillator 21; a radio frequency amplifier 23 for amplifying the electric power of the output wave thereof (carrier 800 MHz band) to create a transmission electric power (10 mW); a bandpass filter 24 compatible with the output wave; and an in-housing antenna 25.

This PLL circuit 20 comprises a digital phase comparator 26 which compares phases of a reference signal $V_r$ input from the reference counter 12 and a comparison signal $V_c$ input from a variable comparison frequency divider 30 and issues a phase difference detection signal in accordance with the phase difference detection signal (phase up signal U, phase down signal D); a charge pump unit 27 for flowing, based on the phase difference detection signal (U, D), a current corresponding to the phase difference into or from a loop filter 40; a loop filter (low bandpass filter) circuit 40 for integrating the current to obtain a DC voltage; a voltage controlled oscillator (VCO) 21 which generates an oscillating signal having a center frequency (carrier frequency) under the control of the DC voltage, effects an FM modulation of this oscillating signal by the input modulation signal AF, and outputs an FM modulated wave $V_o$; and a variable comparison frequency divider 30 for dividing the output frequency $f_o$ of the FM modulated wave $V_o$ with a frequency division ratio of (MN+A).

This variable comparison frequency divider 30 is a dual modulus prescaler comprising a prescaler (fixed frequency divider) 31 having two types of frequency division ratios of 1/M and 1/(M+1) and a program counter 32 having a pulse swallow counter for switching the frequency division ratio of the prescaler 31. The pulse swallow counter is a variable frequency divider comprising an A down counter, an N down counter, and an RS flip-flop and is given the frequency division ratio setting signal from the microprocessor 11. By changing this frequency division ratio setting signal (A, N), the output frequency $f_o$ can be changed by the frequency step equal to the reference frequency $f_r$.

A PLL circuit by nature has a lockup time which is strongly influenced by the time constant of the loop filter. When the time constant of the loop filter is made small, the lockup time becomes short, however, since the amount of high frequency components in the output signal becomes large, the output of the loop filter changes at a high rate in comparison with the low frequency side of about 100 Hz of the input modulation signal. Because of this, when the time constant of the loop filter is small, the loop works to suppress the input of a modulation signal at the low band side and therefore low band FM modulation becomes difficult.

If the time constant of the loop filter is made large in order to prevent the difficulty in FM modulation, however, the lockup time of the loop filter becomes longer so that the frequency pull-in (drawing) process takes a long time to start up when turning on the power supply, etc.

Therefore, in the PLL circuit shown in FIG. 5, a loop filter switching system is adopted.

Namely, the loop filter circuit 40 has a first low bandpass filter 41 and a second bandpass filter 42 connected in series with the output of the charge pump unit 27 and an analog switch 43 for short-circuiting the first low bandpass filter 41 to the charge pump unit 27 in response to a detection signal of an unlock detection circuit 28 for detecting a lack of phase synchronization. In this loop filter switching system, only the second low bandpass filter 42 having a small time constant (i.e., wide band width because of an increased amount of high frequency components or, in other words, because the high band side cut off frequency is high) is used until the PLL circuit pulls in the frequency so as to ensure a high speed lockup at the time of turning on the power supply, etc. After the PLL circuit pulls in the frequency, the first low bandpass filter 41 and the second low bandpass filter 42 are connected in series to realize a loop filter having a large time constant (i.e., narrow band width because of a decreased amount of high frequency components or, in other words, because the high band side cut off frequency is low) so as to ensure the low frequency band FM modulation.

However, the wireless microphone use UHF band carrier FM transmitter using the PLL frequency synthesizer system shown in FIG. 5 has suffered from the following four problems:

(1) In a UHF band carrier wireless microphone system, several tens of KHz or more (100 KHz to 150 KHz) is selected as the channel interval, that is, the reference frequency $f_r$, therefore the comparison frequency $f_c$ given to the phase comparator 26 must be a similar frequency band.

As mentioned above, after the frequency has been drawn in the PLL circuit, the time constant of the loop filter 40 is set to be so large that the cutoff frequency of the high band side is set at a low level of about 1/100th of the above-mentioned reference frequency band in many cases. Therefore, the frequency region of the filter output at the time of the phase locking is substantially the same as the audible frequency region (up to 20 KHz) of the acoustic input AF. For this reason, when the phase lock is about to unlock for some reason or another (when the steady phase is disturbed) etc., the integrated output of the loop filter 40 becomes a source of noise in the audible frequency region as it is.

Due to the purpose of usage of a wireless microphone, the transmission antenna cannot be exposed to the outside, so an in-housing antenna structure where the antenna is accommodated in the wireless microphone body is frequently adopted. Therefore, the transmission energy is fed back to the voltage controlled oscillator, etc., from the in-housing antenna and handling noise due to abnormal oscillation or the body effect is generated unless the voltage controlled oscillator or other circuits are carefully shielded (double shielded). Further, the feedback route of the high frequency signal is not limited to the above spatial route. Feedback also occurs on the circuit. Further, a wireless microphone is usually used in a state held in the hand, therefore vibration, shock, etc. are apt to be applied. Shock noise due to the vibration, shock, etc. is therefore generated unless steps are taken against vibration by using a dielectric element etc. for the voltage controlled oscillator.

In this way, in a wireless microphone, the lockup is inherently easily disturbed due to vibration feedback, etc., therefore in such an incidence dependent instantaneous phase synchronization process, the integrated output of the loop filter 40 appears as a large noise in the audible frequency region. For this reason, in a UHF band carrier wireless microphone, deterioration of an acoustic quality particularly becomes a problem.

(2) The loop filter circuit 40, the PLL circuit 20 without the voltage controlled oscillator 21, the reference oscillator 10, and the reference counter 12 are in many cases commercially available in the form of a built-in prescaler PLL frequency synthesizer IC such as the MB1511 IC made by Fujitsu LTD. Further, there is the advantage that tank circuits need not be inserted at a plurality of positions for reduction of spurious noise. However, since the loop filter circuit 40 is made a loop filter switching type for the purpose of realizing a high speed lockup when turning on the power supply etc., and for ensuring FM modulation after establishing the lockup, this causes an increase in the number of parts and consequently obstructs the reduction of size and the lowering of cost.

SUMMARY OF THE INVENTION

Therefore, in consideration with the above problem, a first object of the present invention is to provide a wireless microphone use UHF band carrier FM transmitter in which any vibration, etc., or feedback, etc., occurring in the wireless microphone does not lead to generation of large noise in the audible frequency region and, in addition, in which it is possible to reduce the steps taken to prevent vibration and the steps to shield against interference.

Further, a second object of the present invention is to provide a wireless microphone use UHF band carrier FM transmitter capable of realizing a reduction of size and a lowering of cost by a reduction of the number of individual parts by eliminating the loop filter switching system.

According to the present invention in order to solve the above problems, briefly, FM modulation is not effected by the use of the modulation signal applied to the voltage controlled oscillator of the PLL circuit, but an FM modulated signal is used as a reference signal applied to an analog phase comparator.

Namely, a wireless microphone use UHF band carrier FM transmitter according to the present invention and has a voltage controlled crystal oscillation type modulation circuit (VCXO) for FM modulating an oscillation frequency of a crystal oscillation circuit by input of a modulation signal of an acoustic signal; an FM modulated signal obtained from the voltage controlled crystal oscillation type modulator is utilized as a reference signal to be input to an analog phase comparator of a PLL circuit so that a high frequency band side cutoff frequency of a loop filter of the PLL circuit is set to the highest audible frequency or more.

In such a configuration, since the FM modulated signal from the VCXO is used as the reference signal for the phase comparator, if the transmission frequency is the UHF band, the frequency of the reference signal can be raised to about 10 MHz. Therefore, the time constant of the loop filter in the PLL circuit may be so large that the cutoff frequency of the loop filter may be the one for high band frequency of about 100 KHz (=10 Mhz/100) which is higher than the highest audible frequency (about 20 KHz). For this reason, even if the lockup is disturbed due to vibration, feedback, etc., the integrated output of the loop filter moves at a high frequency inaudible frequency, therefore does not appear as generation of audible noise. Note that when a high speed (small time constant) loop filter is used, generally although the amplitude rises at the low frequency band side, since the output of the analog phase comparator is in the high frequency band, it is away from the rise position of the amplitude, so there is no problem.

Further, since the modulation is not effected in the VCO of the PLL circuit, but the FM modulated wave from the VCXO is input to the analog phase comparator of the PLL circuit, the FM modulation is ensured even if the time constant of the loop filter is not made large. Further, since the time constant of the loop filter can be made small, high speed lockup is also ensured at the time of turning on the power supply etc. The fact that the loop filter switching system need not be adopted contributes to the reduction of the number of the individual parts by that amount. Further, since use is made of not a digital phase comparator, but an analog phase comparator, the charge pump circuit etc. also become unnecessary. Further, as mentioned above, vibration, feedback, etc. are not converted to audible frequency noise, therefore the steps to shield against interference and the steps to give resistance to vibration of the voltage controlled oscillator (VCO) etc. can be reduced. Accordingly, a reduction of size and a lowering of cost can be realized in comparison with conventional PLL type transmitters.

The high band side cutoff frequency of the loop filter is preferably set within a range from about 100 KHz to about 1 MHz. This is because if the high band side cutoff frequency is the highest audible frequency (about 20 KHz) to several tens of KHz, the elimination of the audible frequency noise is incomplete. On the other hand, when the high band side cutoff frequency exceeds about 1 MHz, there is an apprehension that the high band side of the transmission frequency will exceed the UHF band, so problems are caused in the radio wave regulations of various countries.

When the voltage controlled crystal oscillation type modulation circuit includes a channel switching circuit for varying the DC bias voltage higher or lower to change the oscillation frequency, the configuration can be simplified in comparison with the case where the variable frequency divider 30 (FIG. 5) of the conventional frequency synthesizer system is used on the comparison signal side.

For example, as the above-mentioned channel switching circuit, a configuration having a plurality of variable resistors for DC dividing the power supply voltage and a multipoint switch for switching and supplying the DC divided voltages as the DC bias voltage can be adopted.

Note that it is also possible to provide a reference frequency divider (fixed frequency divider or variable frequency divider) for dividing the frequency of the FM modulation signal output from the VCXO and to utilize the frequency divided output as the reference signal.

BRIEF DESCRIPTION OF THE DRAWINGS

The above objects and features of the present invention will be more apparent from the following description of the preferred embodiments when read in conjunction with the accompanying drawings, wherein.

DESCRIPTION OF THE PREFERRED EMBODIMENTS

Next, an aspect of the present invention will be explained with reference to the attached drawings.

Figure 1:
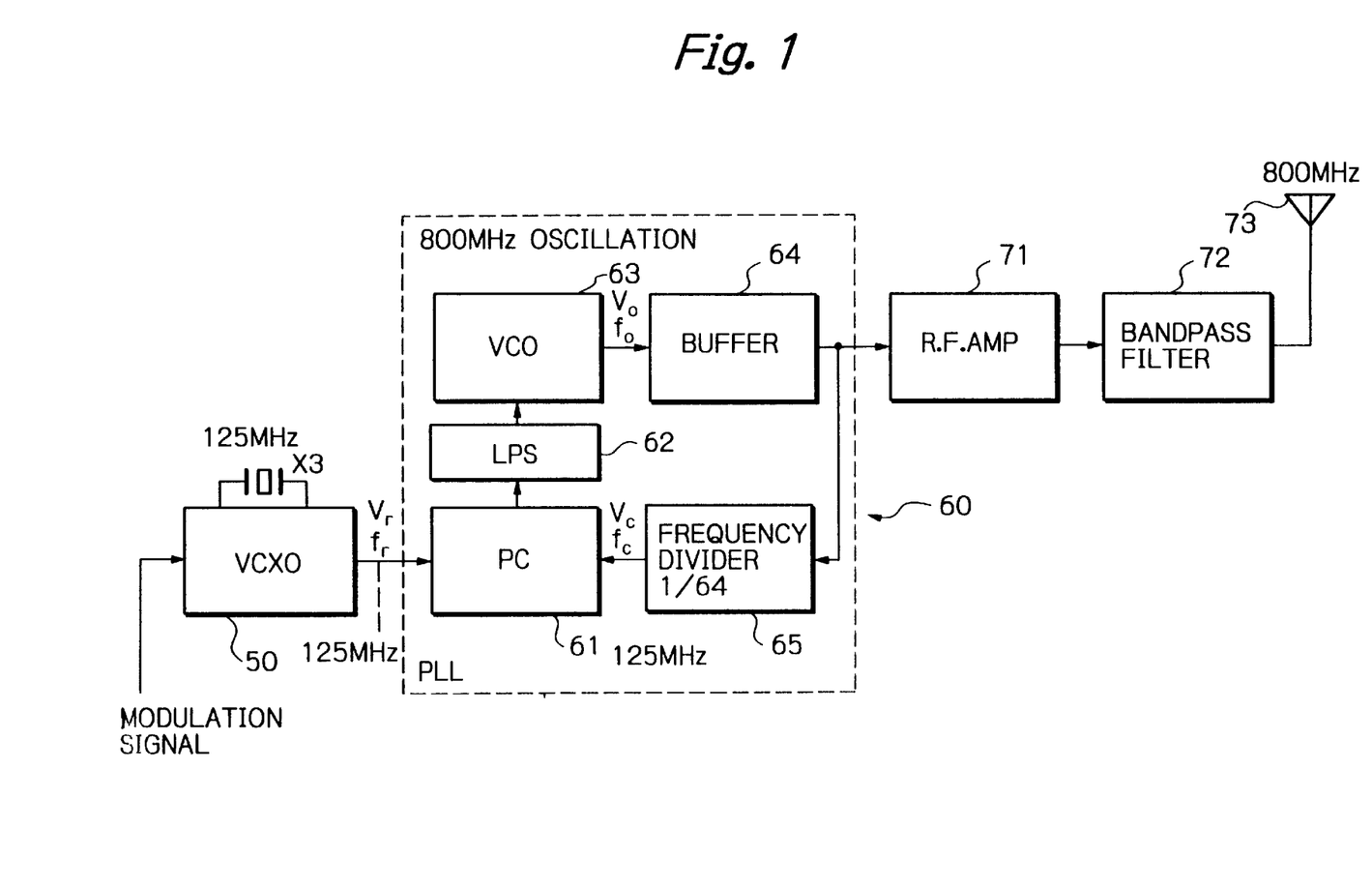
FIG. 1 is a block diagram of a wireless microphone use UHF band carrier FM transmitter according to an embodiment of the present invention.

FIG. 1 is a block diagram of a wireless microphone use UHF band carrier FM transmitter according to an embodiment of the present invention.

The FM transmitter of this embodiment of the invention comprises a voltage controlled crystal oscillation type modulator (VCXO) 50 for performing FM modulation by voltage controlled oscillation by changing the load capacitance of a crystal oscillator X3 (basic frequency: 12.5 MHz) by an acoustic wave AF (input of a modulation signal having an audible frequency of 10 Hz to 20 kHz); a PLL circuit 60 having an analog phase comparator 61 to which the FM modulated wave $V_r$ is input as a reference signal; a radio frequency amplifier 71 for amplifying the electric power of the output wave of a buffer amplifier (buffer) 64 in the PLL circuit 60 to create a transmission electric power (10 mW); a bandpass filter 72 compatible with the output wave; and an in-housing antenna 73.

The PLL circuit 60 of the present embodiment of the invention comprises the analog phase comparator 61 which compares phases of the reference signal $V_r$ input from the VCXO and a comparison signal $V_c$ input from a comparison frequency divider 65 and issues a phase difference signal in accordance with the phase difference; a loop filter (low bandpass filter LPF) 62 for integrating the phase difference signal; a voltage controlled oscillator (VCO) 63 for controlling the oscillation frequency $f_o$ of the output wave $V_o$ by the filter output voltage; a buffer amplifier 64 which is loosely coupled with the voltage controlled oscillator 63 and prevents the effect of the next stage on from being fed back to the voltage controlled oscillator 63; and a comparison frequency divider 65 for dividing the oscillation frequency $f_o$ of the output wave $V_o$ (800 MHz band) with a frequency division ratio of 1/64. Of course, the comparison frequency divider 65 is not limited to a fixed frequency divider. For multiple channels, it is also possible to constitute a frequency synthesizer of the dual modulus prescaler system or the like by using a microcomputer or variable frequency divider.

Note that when the crystal oscillator is the one for generating a signal with a carrier frequency of 12.5 Mhz, and when the output signal is subject to FM modulation by a shift of ±500 Hz, the carrier frequency will be 800 MHz and the shift (deviation) will be 32 KHz.

In the present aspect of the invention, the reference frequency $f_r$ input to the analog phase comparator 61 is as high as 12.5 MHz so as to enable high speed phase comparison. For this reason, the time constant can be made small so that the cutoff frequency of the loop filter 62 can be set to the one for a high band frequency of about 100 kHz, therefore, the selection of a much higher frequency than the highest audible frequency 20 kHz becomes possible. For this reason, even if the lockup is disturbed due to vibration, feedback, etc. so that the process is returned to the phase synchronization process for an instant, since the integrated output of the loop filter 62 moves at the inaudible frequency of about 100 kHz to 1 MHz, there is little generation of audible noise along with this.

Further, since the FM modulated wave from the VCXO is input to the phase comparator 61 and the modulation signal is not input to the VCO, the FM modulation is guaranteed. Further, since the time constant of the loop filter can be made small, high speed lockup at the time of turning on the power supply etc. is also guaranteed. Still further, adoption of the loop filter switching system such as the PLL circuit shown in FIG. 5 becomes unnecessary. Further, since an analog phase comparator is used, the charge pump circuit etc. can be made unnecessary. Therefore, the number of individual parts is reduced to enable realization of a reduction of size and a lowering of cost. In addition to this, the steps for shielding against interference and the steps for giving resistance to vibration can be reduced, therefore a further reduction of size and lowering of cost are realized.

In general, in the conventional digital phase comparator, when the comparison frequency $f_c$ is set to a high frequency, the amount of high frequency components in the output signal is increased so that the carrier purity is poor and adjoining channel leakage cannot be suppressed. In contrast, the analog phase comparator PC of the present embodiment of the invention has a narrower range in which it can lock the signal in comparison with the digital phase comparator, but there is no sharp pulse waveform in the output waveform after phase comparison as in the digital type, therefore the loop filter 62 of the latter stage can be simplified and a high C/N ratio can be obtained.

Figure 2:
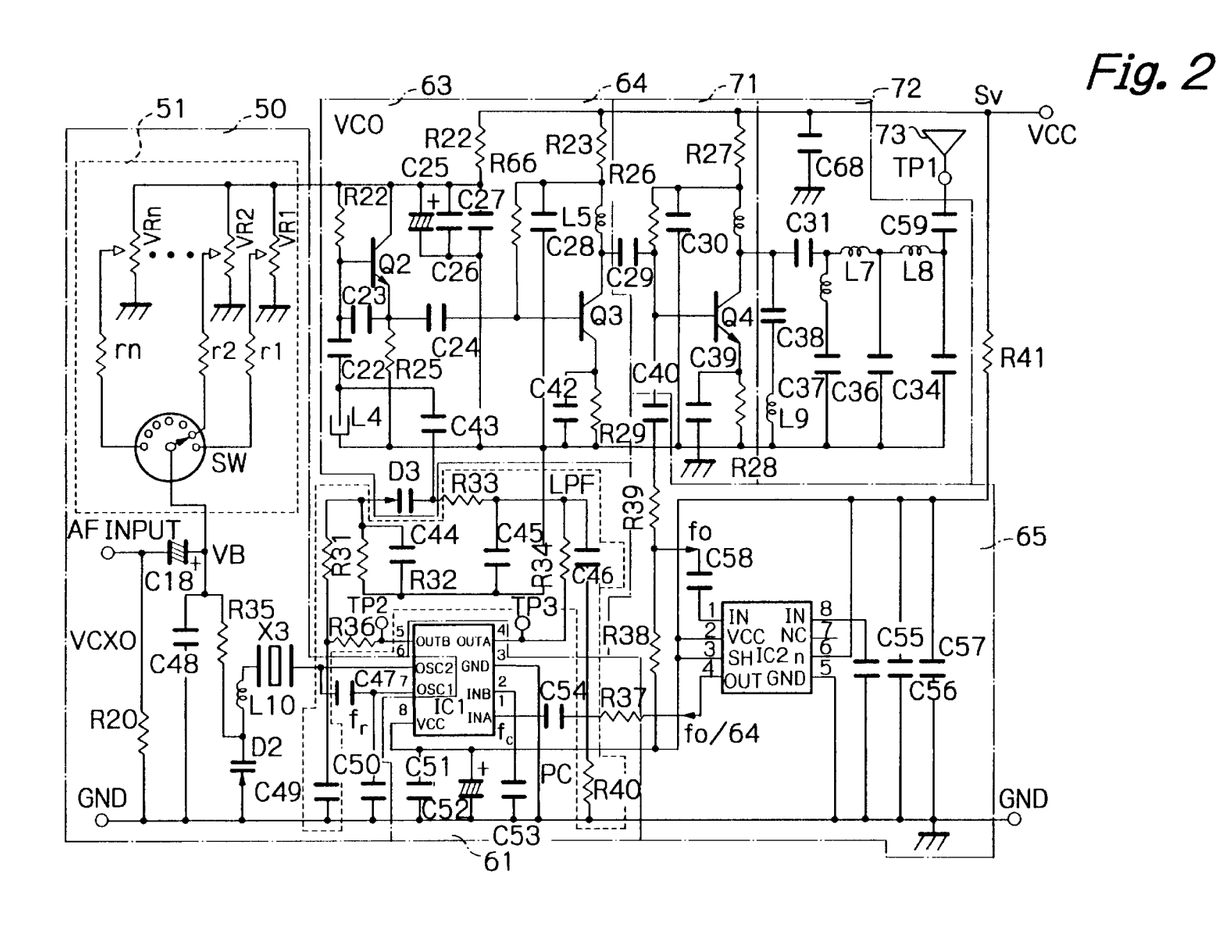
FIG. 2 is a circuit diagram of the wireless microphone use UHF band carrier FM transmitter shown in FIG. 1.

FIG. 2 is a circuit diagram of the wireless microphone use UHF band carrier FM transmitter shown in FIG. 1.

The voltage controlled crystal oscillation type modulator (VCXO) mainly comprises a crystal oscillator X3 having a resonance frequency of 12.5 MHz, a coil L10, a variable capacitance diode D2, an oscillation circuit in an IC 1 (NE602AD made by Philips), a channel switching circuit 51 for obtaining a DC bias voltage VB, and a capacitor C18 for passing the input of a modulation signal AF as the audio signal by eliminating a DC component. R20 and the resistor R35 are resistors, and C47, C48, and C50 are capacitors.

The crystal oscillator X3, the coil L10 and the variable capacitance diode D2 are connected between a sixth pin of the IC 1 and the ground GND. The capacitor C47 is connected between a seventh pin of the IC1 and the crystal oscillator X3. The modulation signal AF is applied to a cathode side of the variable capacitance diode D2 connected in series to the crystal. oscillator X3 so as to vary the load capacitance of the crystal oscillator X3, effecting an FM modulation on the resonance frequency of the crystal oscillator X3.

The channel switching use circuit comprises a plurality of parallel connected variable resistors VR1 to VRn for dividing the DC voltage of the power supply voltage VCC, current limiting resistors r1 to rn connected in series to the voltage division outputs of the sliding contacts, and a multipoint switch SW for switching and supplying the DC divided voltages as the DC bias voltage VB to the crystal oscillation circuit. When switching channels, the multipoint switch SW is operated to select one of the variable resistors VR1 to VRn and change the DC bias voltage VB and thereby change the oscillation frequency. The variable resistors VR1 to VRn are used for fine adjustment of the frequency.

The analog phase comparator PC of the PLL circuit mainly comprises the above-mentioned IC 1. This IC 1 has a built in oscillation circuit centered around a double balanced mixer (multiplier) and positioned at the reference signal (FM modulated wave) side as mentioned above and a differential amplifier using the first pin as the input and positioned at the comparison signal side. Differential outputs of the forward phase and inverse phase are output from a fourth pin and a fifth pin of this IC 1.

The loop filter (LPF) is constituted by resistors R31, R32, R33, R34, R36, and R40, and capacitors C44, C45, C46, and C49 and has a combination of a lag filter and a lag lead filter. Here, the high band side cutoff frequency of the loop filter of the present example is about 650 KHz.

The voltage controlled oscillator VCO of the PLL circuit mainly comprises a variable capacitance diode D3, a dielectric resonatore L4, and a transistor Q2. The output from the fourth pin of the IC 1 is integrated by a relatively high speed time constant and applied to the cathode of the variable capacitance diode D3. The output from the fifth pin of the IC 1 is integrated by a large time constant, and then an offset is applied to a GND voltage through the resistor 32. The integrated result is applied to an anode of the variable capacitance diode D3. The AC component at the anode of the variable capacitance diode D3 is connected to the ground GND through the capacitor C44, while the cathode of the variable capacitance diode D3 is connected to the hot side of the dielectric resonator L4 through the capacitor C43 having a small capacitance. The voltage controlled oscillator VCO of the PLL circuit is basically set to generate an oscillation frequency of the 800 MHz band by the resonance frequency resulting from an internal capacitance of the variable capacitance diode D3 and internal capacitances of the capacitor C43, an inductor of the dielectric resonator L4, capacitors C22 and C23, and the transistor Q2. The dielectric resonator L4 is used for the oscillation use resonator and contributes to an improvement of the C/N ratio. Note that R21, R22, and R25 are resistors, and C24, C25, C26, and C27 are capacitors.

The buffer amplifier 64 is constituted by a transistor Q3, resistors R66, R23, and R29, capacitors C28 and C42, and an inductor L5.

The high frequency amplifier 71 is constituted by a transistor Q4, resistors R26, R27, and R28, capacitors C29, C30, and C39, and an inductor L11.

The bandpass filter 72 is a circuit for attenuating the frequency other than the 800 MHz band and for impedance matching with the antenna 73 and is constituted by the capacitors C31, C34, C36, C37, C38, C68, and C69 and the inductors L7, L8, and L9.

The comparison frequency divider 65 has an IC 2 (MB501 made by Fujitsu). Electric power of 800 MHz obtained by passing a collector output of the transistor Q3 through the capacitors C29 and C40 and dividing the voltage at the resistors R39 and R38 is input to the first pin of the IC 2. The IC 2 divides the frequency of the 800 MHz band by the frequency division ratio of 1/64 and sends the comparison signal of the 12.5 MHz band from the fourth pin to the phase comparator PC. Note that R37 and R41 are resistors, and C55, C56, C57, C57, and C58 are capacitors.

Figure 3:
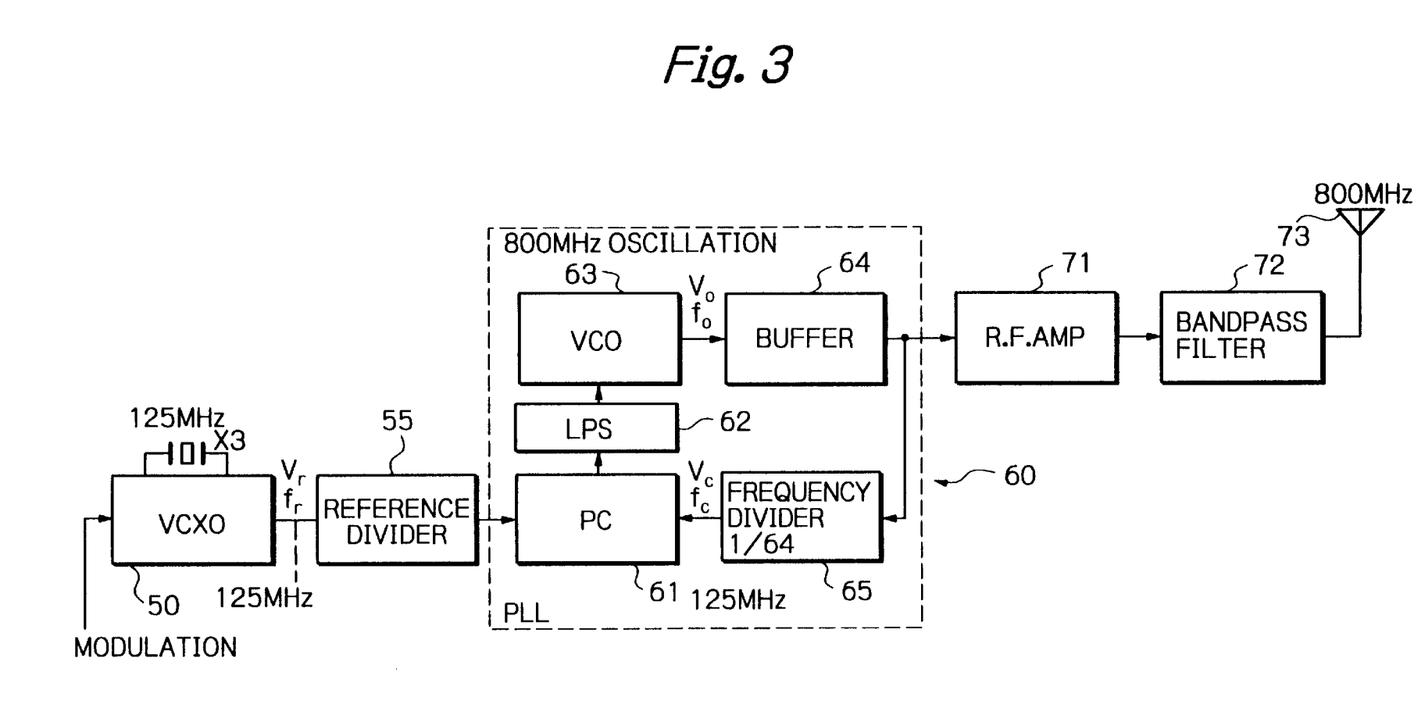
FIG. 3 is a block diagram of a wireless microphone use UHF band carrier FM transmitter according to another embodiment of the present invention.

FIG. 3 is a block diagram of a wireless microphone use band carrier FM transmitter according to another embodiment of the present invention. A difference between FIG. 1 and FIG. 3 is that, in FIG. 3, a reference divider 55 is inserted between the voltage controlled crystal oscillation type modulator (VCXO) 50 and the analog phase comparator 61. In this embodiment, the frequency of the output signal of the VCXO 50 is 12.5 MHz or its multiple, and the frequency of the output signal of the reference divider 55 is 12.5 MHz.

As explained above, the wireless microphone use UHF band carrier FM transmitter according to the present invention is characterized in that FM modulation is not applied to the voltage controlled oscillator of the PLL circuit by the input of a modulation signal, but use is made of a reference signal input to the analog phase comparator of the PLL circuit as the FM modulated wave and in that the high band side cutoff frequency of the loop filter is set to the highest audible frequency or more and thereby exhibits the following effects.

(1) While a wireless microphone is very easily disturbed in lockup by vibration, feedback, etc., since is it compares phases at a high speed and since the integrated output of the loop filter moves at an inaudible frequency, there is no generation of audible noise. Accordingly, a high performance FM transmitter compatible with a wireless microphone can be provided. Further, since the steps for shielding against interference and the steps for giving resistance to vibration can be reduced, it is possible to realize a reduction of cost.

Since modulation is not applied at the final stage VCO of the PLL circuit, but an FM modulated wave from the VCXO is input to the phase comparator of the PLL circuit, even if the time constant of the loop filter is not made large, the FM modulation is guaranteed. Further, since the time constant of the loop filter can be made small, high speed lockup at the time of turning on the power supply etc. is guaranteed. For this reason, a loop filter switching system need not be adopted, which contributes to the reduction of the number of individual parts by that amount. Further, since not a digital phase comparator, but an analog phase comparator is used, it is also possible to eliminate the charge pump circuit etc. and thereby simplify the loop filter. In addition, due to the reduction of the steps for shielding against interference and the steps for giving resistance to vibration, a reduction of size and a lowering of cost can be achieved in comparison with a conventional PLL system transmitter.

(2) When the high band side cutoff frequency of the loop filter is set within a range from 100 kHz to 1 MHz, generation of audible noise due to vibration, feedback, etc. can be substantially completely suppressed.

(3) When the voltage controlled crystal oscillation type modulation circuit includes a channel switching circuit for setting the DC bias voltage of the crystal oscillation circuit higher or lower to change the oscillation frequency variable, the circuit configuration can be simplified and the cost can be lowered in comparison with the case where a variable frequency divider of the frequency synthesizer system is used on the comparison signal side.

What is claimed is:

1. A wireless microphone use UHF band carrier FM transmitter adopting a PLL circuit that includes an analog phase comparator, and a loop filter connected to the output of said phase comparator, said transmitter comprising:

a crystal oscillation circuit for generating an oscillation signal; and a voltage controlled crystal oscillation type modulation circuit having an input for receiving a modulation signal with a frequency of an acoustic signal, for FM modulating said oscillation signal generated by said crystal oscillation circuit by said modulation signal to generate an FM modulated signal;

said analog phase comparator having a reference input for receiving a reference signal, said reference signal being said FM modulated signal obtained from the voltage controlled crystal oscillation type modulator;

said loop filter having a high band side cutoff frequency that is equal to or greater than °KHz.

2. A wireless microphone use UHF band carrier FM transmitter as set forth in claim 1, wherein the high band side cutoff frequency of the loop filter is in a range from 100 kHz to 1 MHz.

3. A wireless microphone use UHF band carrier FM transmitter as set forth in claim 1 or claim 2, wherein the voltage controlled crystal oscillation type modulation circuit has a channel switching circuit able to change the oscillation frequency by setting a DC bias voltage of the crystal oscillation circuit higher or lower.

4. A wireless microphone use UHF band carrier FM transmitter as set forth in claim 3, wherein the channel switching circuit comprises a plurality of variable resistors for dividing a DC voltage of the power supply; and a multipoint switch for switching and supplying each of the divided DC voltages as the DC bias voltage.

5. A wireless microphone use UHF band carrier FM transmitter as set forth in claim 1, further comprising a reference frequency divider for dividing the frequency of the FM modulated signal output from the voltage controlled crystal oscillation type modulation circuit and wherein the frequency divided output is utilized as the reference signal.

* * * * *

UNITED STATES PATENT AND TRADEMARK OFFICE
CERTIFICATE OF CORRECTION

PATENT NO.    : 6,246,864 B1
DATED         : June 12, 2001
INVENTOR(S)   : Koike It is certified that error appears in the above-identified patent and that said Letters Patent is hereby corrected as shown below:

Title page,
The title page should be deleted and substituted with the attached title page.

Drawings,
Replace Figures 1 and 3 with the attached substitute figures 1 and 3.

Signed and Sealed this

Twenty-eighth Day of May, 2002

*Attest:*

*Attesting Officer*

JAMES E. ROGAN
*Director of the United States Patent and Trademark Office*

(12) United States Patent
Koike (10) Patent No.: US 6,246,864 B1
(45) Date of Patent: Jun. 12, 2001

(54) WIRELESS MICROPHONE USE UHF BAND CARRIER FM TRANSMITTER

(75) Inventor: Yukinaga Koike, Nagano (JP)

(73) Assignee: Circuit Design, Inc., Hotaka-machi (JP)

( * ) Notice: Subject to any disclaimer, the term of this patent is extended or adjusted under 35 U.S.C. 154(b) by 0 days.

(21) Appl. No.: 09/159,393

(22) Filed: Sep. 23, 1998

(30) Foreign Application Priority Data

Sep. 25, 1997 (JP) .................................. 9-260245

(51) Int. Cl.$^7$ .................................. H04B 1/04
(52) U.S. Cl. .................. 455/110; 455/112; 455/118
(58) Field of Search ........................ 455/110, 113, 455/112, 118; 381/14, 26, 91, 122

(56) References Cited

U.S. PATENT DOCUMENTS 5,790,942 * 8/1998 Le Corre et al. ............ 455/110
5,794,130 * 8/1998 Abe et al. ................ 455/113

* cited by examiner

*Primary Examiner*—Curtis Kuntz
*Assistant Examiner*—Melur Ramakrishnaiah
(74) *Attorney, Agent, or Firm*—Armstrong, Westerman, Hattori, McLeland & Naughton (57) ABSTRACT

A wireless microphone use UHF band carrier FM transmitter adopting a PLL system, which has a voltage controlled crystal oscillation type modulator (VCXO) for performing FM modulation on an oscillation frequency of a crystal oscillation circuit by an input of a modulation signal AF of an acoustic signal and which uses an FM modulated signal $f_r$ obtained from the VCXO as a reference signal $V_r$ to be input to an analog phase comparator (PC) of a PLL circuit 60. The PC performs a phase comparison operation at a high speed (10 MHz or more), therefore a cutoff frequency of a loop filter (62) may be a high band frequency of about 100 KHz to 1 MHz so that the cutoff frequency considerably higher than the highest audible frequency 20 KHz can be selected. The filter output moves at an inaudible frequency and therefore there is no audible noise generated even due to vibration, feedback, etc. It is also possible to make the charge pump circuit and other steps for shielding against interference and steps for giving resistance to vibration superfluous without adopting the loop filter switching system, therefore a reduction of size and a lowering of cost can be realized.

5 Claims, 5 Drawing Sheets

Fig. 1

Fig. 3